(12) United States Patent
Sun

(10) Patent No.: US 6,787,956 B2
(45) Date of Patent: Sep. 7, 2004

(54) MAGNETIC SHAFT FOR BRUSHLESS D.C. MOTOR

(75) Inventor: Duhua Sun, Shanghai (CN)

(73) Assignee: Shanghai Yen Sun Electrical Industry Co., Ltd., Shanghai (CN)

( * ) Notice: Subject to any disclaimer, the term of this patent is extended or adjusted under 35 U.S.C. 154(b) by 0 days.

(21) Appl. No.: 10/173,013

(22) Filed: Jun. 18, 2002

(65) Prior Publication Data

US 2003/0025410 A1 Feb. 6, 2003

(30) Foreign Application Priority Data

Jul. 31, 2001 (CN) .......................................... 01252819

(51) Int. Cl.$^7$ ................................................. H02K 7/09
(52) U.S. Cl. ...................................... 310/90.5; 310/90
(58) Field of Search .................... 310/90.5, 90, 268

(56) References Cited

U.S. PATENT DOCUMENTS 5,019,738 A  *  5/1991  Weilbach et al. .......... 310/90.5
5,883,454 A  *  3/1999  Hones et al. .............. 310/90.5
5,959,382 A  *  9/1999  Dauwalter ................. 310/90.5
6,265,798 B1 *  7/2001  Huang et al. .............. 310/90.5
6,420,810 B1 *  7/2002  Jeong ........................ 310/90.5

* cited by examiner

Primary Examiner—Dang Le
Assistant Examiner—Hanh N Nguyen
(74) Attorney, Agent, or Firm—Birch, Stewart, Kolasch & Birch, LLP

(57) ABSTRACT

A brushless D.C. motor comprises a casing, a bearing, a stator, and a rotor having a shaft. The bearing is mounted to an end of the shaft. A first magnetic member is mounted on an inner side of the casing. A second magnetic member is formed on the other end of the shaft and faces and is spaced from the first magnetic member. The shaft floats on an axis by magnetic force provided by the first and second magnetic members to thereby reduce the load to the bearing. Thus, the frictional resistance is low, and rotation of the motor is smooth with a low noise. The motor is shock-resistant and has a long life. Thus, the motor is particularly suitable for portable electronic products.

5 Claims, 3 Drawing Sheets

MAGNETIC SHAFT FOR BRUSHLESS D.C. MOTOR

BACKGROUND OF THE INVENTION

1. Field of the Invention

The present invention relates to a motor. In particular, the present invention relates to a brushless D.C. motor.

2. Description of the Related Art

A computer generally not only requires a suitable ambient temperature but also requires timely expelling of heat generated by the electronic elements of the computer during operation so as to keep the electric circuits of the computer stable. To this end, a brushless D.C. motor having a power not greater than 3W is usually mounted inside the main casing of a personal computer for expelling heat generated by the electronic elements in the main casing. Due to the advantages of small size, few parts, light weight, and large air output, such a brushless D.C. motor is not only widely used in computers but also in other electronic products that requires heat dissipation. Currently, the rotor of a brushless D.C. motor is supported by an oily bearing which has the advantages of simple structure, easy manufacture, low cost, and excellent lubrication. Since the overall weight of the rotor is supported by the bearing that does not turn, when the rotor shaft is located in a horizontal plane, the lower side wall of the hole of the oily bearing receiving the rotor shaft is subject to force. As a result, the lower side wall is worn and becomes ellipsoid after a period of time, and rotation of the rotor shaft would not be smooth. Noise is generated, and the life of the motor is shortened. Unfortunately, the shaft of the brushless D.C. motor used in electronic products lies in a horizontal plane, and the wear due to gravity of the shaft is inevitable to the oily bearing. The noise is extremely annoying if it is used in a portable electronic device such as a portable computer (or so-called "notebook") or testing equipment. In order to prevent generation of noise, the oily bearing includes an O-ring and a washer in each of two ends thereof. However, such a structure causes an obstruction to timely expelling of the gas generated as a result of friction of the rotor shaft at high speed and the wall of the hole of the bearing receiving the rotor shaft. Thus, the gas solidifies into nitride that blocks the gap between the rotor shaft and the bearing. The friction is increased, and the life of the motor is further shortened. Roller bearings mounted on two ends of the rotor shaft have been proposed to solve the problem of the offset wear of the oily bearing resulting from offset load and the noise resulting from the wear, and the performance was proved excellent. However, the roller bearings are more expensive than the oily bearings, and the installation of the roller bearings are not easy. The cost is thus high. In addition, the bearings have a poor cushioning effect to mechanical vibrations. The offset load to the bearings is not completely eliminated such that offset wear may still occur.

SUMMARY OF THE INVENTION

It is the primary object of the present invention to provide a magnetic shaft for a brushless D.C. motor to mitigate and/or obviate the offset wear of the bearing resulting from the weight of the rotor, to improve the cushioning ability for absorbing the mechanical vibrations, and to reduce the cost for production.

A brushless D.C. motor in accordance with the present invention comprises a casing, a bearing, a stator, and a rotor having a shaft. The bearing is mounted to an end of the shaft. A first magnetic member is mounted on an inner side of the casing. A second magnetic member is formed on the other end of the shaft and faces and is spaced from the first magnetic member. The shaft floats on an axis by magnetic force provided by the first and second magnetic members to thereby reduce the load to the bearing. Thus, the frictional resistance is low, and rotation of the motor is smooth with a low noise. The motor is shock-resistant and has a long life. Thus, the motor is particularly suitable for portable electronic products.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
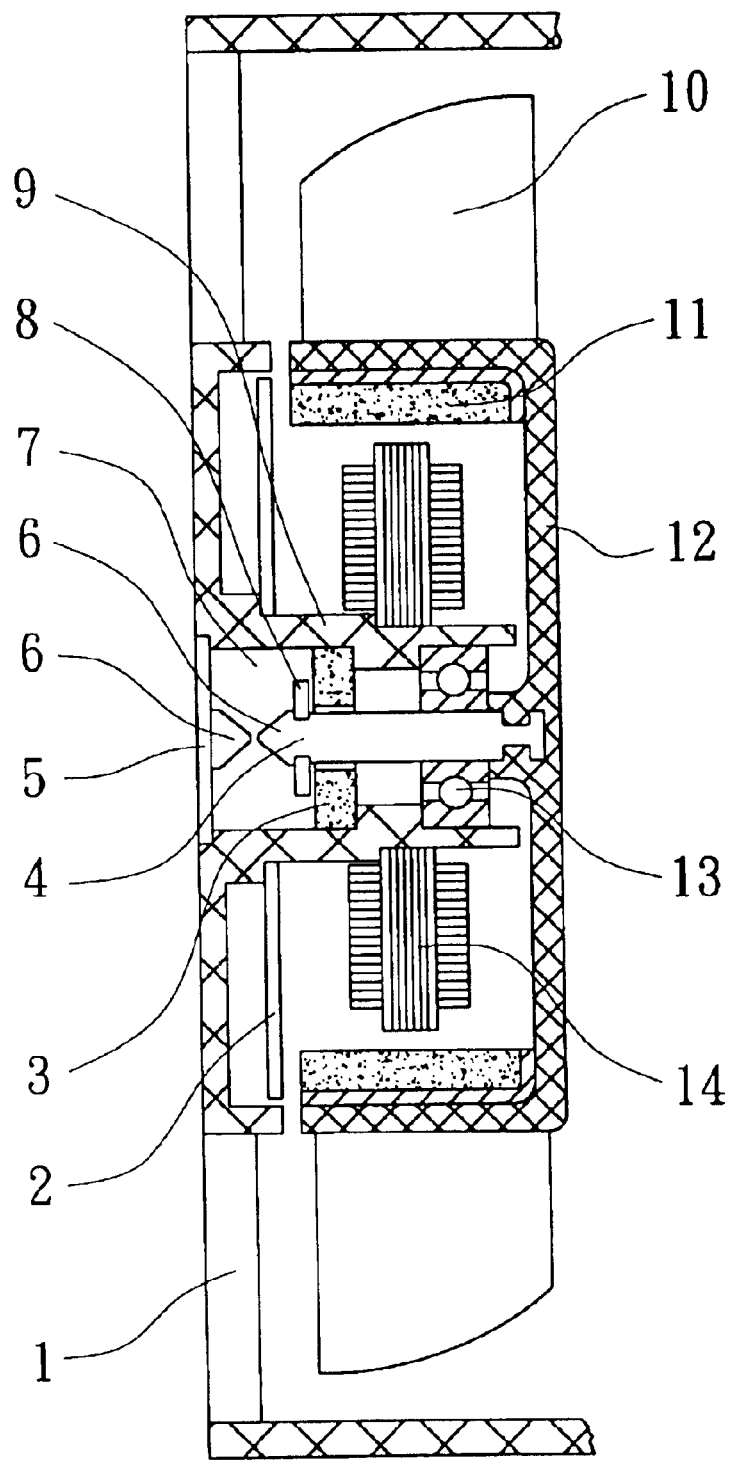
FIG. 1 is a sectional view of a first embodiment of a brushless D.C. motor in accordance with the present invention.

Referring to FIG. 1, a brushless D.C. motor in accordance with the present invention generally includes a casing 1, a stator 14, a rotor 12 having a plurality of blades 10 and a shaft 4, and a ball bearing 13. The casing 1 includes an air inlet and an air outlet that are located in positions associated with the blades 10. A circuit board 2 is mounted in the casing 1. The stator 14 is mounted around a tube 9 located in the casing 1. The rotor 12 is mounted around the stator 14 and includes a magnet 11 attached to an inner periphery thereof. The blades 10 are formed on an outer periphery of the rotor 4, and the shaft 4 has an end fixed to a center of the rotor 4.

The tube 9 includes a hole 7 having a flange or separation wall, thereby dividing the hole 7 into a first section for receiving the ball bearing 13 and a second section for receiving the other end of the shaft 4. The ball bearing 13 is located in the first section of the hole 7 and allows the shaft 4 to extend therethrough.

A pair of magnetic members 6 is provided in the second section of the hole 7. One of the magnetic members 6 is located on a center of a side of the casing 1 that aligns the other end (i.e., the distal end) of the shaft 4, and the distal end of the shaft 4 forms the other magnetic member 6, i.e., the shaft 4 is magnetic. In this embodiment, an anti-dust lid 5 is mounted to seal an end of the hole 7, and one of the magnetic members 6 is mounted on an inner side of the lid 5 and faces and is spaced from the distal end of the shaft 4. Alternatively, the other one of the magnetic members 6 may be an extension of the distal end of the shaft 4. The magnetic members 6 may be two permanent magnets of opposite polarities. Alternatively, one of the magnetic members 6 is a permanent magnet, and the other is an electromagnet. In order to increase the magnetism, each magnetic member 6 may include a pointed end.

A protective member 3 is mounted in the hole 7 and includes a circular central hole through which the shaft 4 extends. The protective member 3 is near the distal end of the shaft 4. Normally, a large gap exists between the circular central hole of the protective member 3 and the shaft 4 to prevent contact of the shaft 4 with the protective member 3.

When the motor vibrates, the shaft 4 could be in contact with the protective member 3 for a relatively short time, thereby restraining radial movement of the shaft 4. Further, a retainer ring 8 is mounted to the distal end of the shaft 4 to prevent axial movement of the shaft 4.

The magnetic members 6 cooperate with the ball bearing 13 to provide a function of maintaining the shaft 4 in the original plane on which the shaft 4 is mounted. Thus, even if the shaft 4 is located in a horizontal plane, the shaft 4 does offset from the horizontal plane and thus rotates stably. Offset wear to the ball bearing 13 resulting from the weight of the shaft 4 is avoided.

Figure 2:
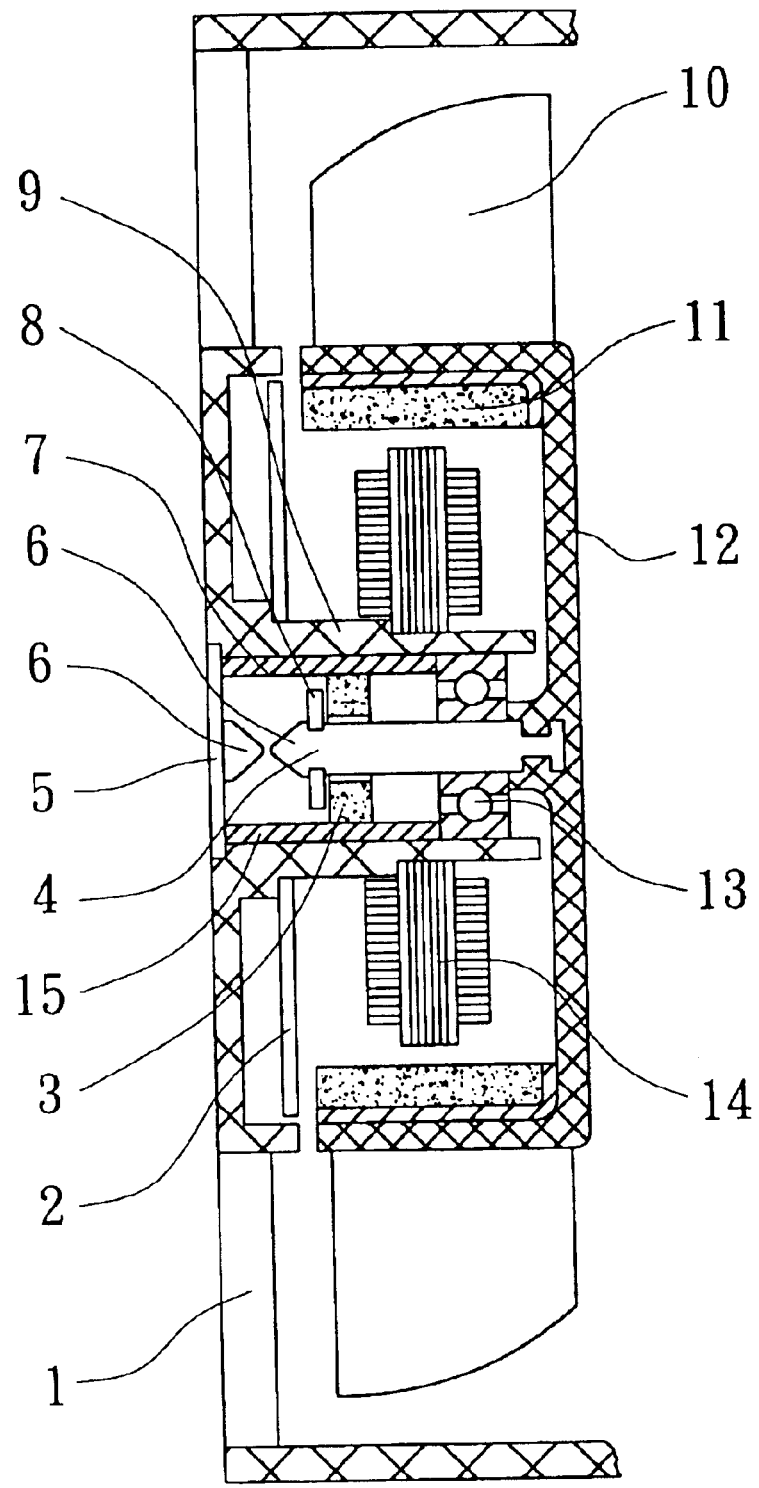
FIG. 2 is a sectional view of a second embodiment of the brushless D.C. motor in accordance with the present invention.

FIG. 2 illustrates a second embodiment of the invention. In this embodiment, the brushless D.C. motor includes a casing 1, a stator 14, a rotor 12 having a plurality of blades 10 and a shaft 4, and a ball bearing 13. The casing 1 includes an air inlet and an air outlet that are located in positions associated with the blades 10. A circuit board 2 is mounted in the casing 1. Further, the casing 1 includes a tube 9 in a center thereof, the tube 9 having a hole 7. The stator 14 is mounted around the tube 9. The rotor 12 is mounted around the stator 14 and includes a magnet 11 attached to an inner periphery thereof. The blades 10 are formed on an outer periphery of the rotor 12, and the shaft 4 has an end fixed to a center of the rotor 12.

A magnetically conductive tube 15 is mounted in the hole 7. The roller bearing 13 is located in an end of the hole 7 and allows the shaft 4 to extend therethrough. As illustrated in FIG. 2, the ball bearing 13 is located near the end of the shaft 4 secured to the center of the rotor 12. An end of the magnetically conductive tube 15 abuts an end face of the ball bearing 13, and the other end of the magnetically conductive tube 15 abuts against an inner side of an anti-dust lid 5 that is mounted to the casing 1 for sealing the hole 7.

A pair of magnetic members 6 is provided in the hole 7. One of the magnetic members 6 is located on the inner side of the lid 5 that aligns the distal end of the shaft 4, and the distal end of the shaft 4 forms the other magnetic member 6. The magnetic members 6 may be two permanent magnets of opposite polarities. Alternatively, one of the magnetic members 6 is a permanent magnet, and the other is an electromagnet.

A protective member 3 is mounted in the hole 7 and includes a circular central hole through which the shaft 4 extends. The protective member 3 is near the distal end of the shaft 4. Normally, a large gap exists between the circular central hole of the protective member 3 and the shaft 4 to prevent contact of the shaft 4 with the protective member 3. When the motor vibrates, the shaft 4 could be in contact with the protective member 3 for a relatively short time, thereby restraining radial movement of the shaft 4. Further, a retainer ring 8 is mounted to the distal end of the shaft 4 to prevent axial movement of the shaft 4.

The magnetic members 6 cooperate with the ball bearing 13 to provide a function of maintaining the shaft 4 in the original plane on which the shaft 4 is installed. Thus, even if the shaft 4 is located in a horizontal plane, the shaft 4 does offset from the horizontal plane and thus rotates stably. Offset wear to the ball bearing 13 resulting from the weight of the shaft 4 is avoided. Due to provision of the magnetically conductive tube 15, a magnetic loop is formed as follows: the magnetic members 6→the lid 5→the magnetically conductive tube 15→the shaft 4→the magnetic members 6. Thus magnetic loop does not interfere with normal operation of the other elements.

Figure 3:
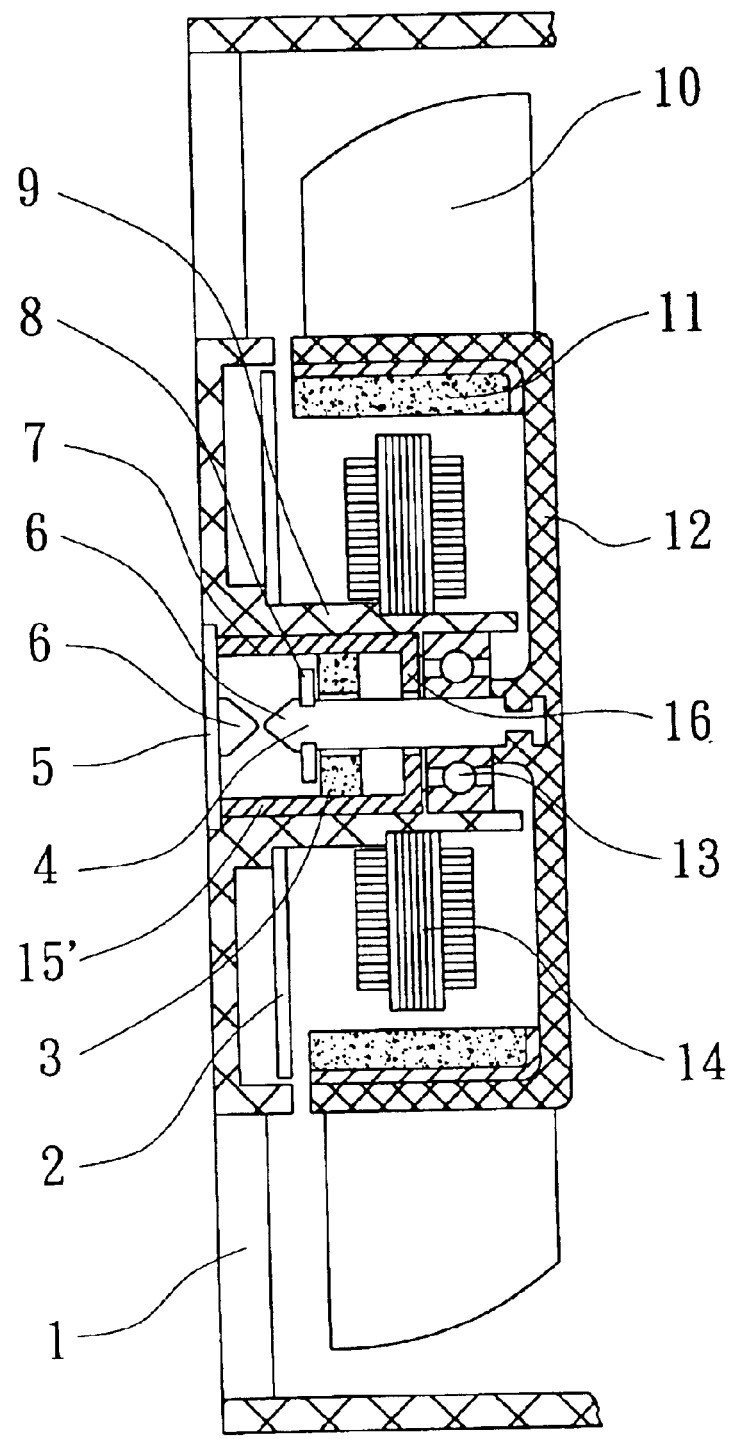
FIG. 3 is a sectional view of a third embodiment of the brushless D.C. motor in accordance with the present invention.

FIG. 3 illustrates a third embodiment of the invention that is modified from the second embodiment. The only difference between this embodiment and the second embodiment resides in the shape of the magnetically conductive tube. Namely, the magnetically conductive tube (now designated by 15') of the third embodiment has an end face 16 to which the bearing 13 rests. A magnetic loop is formed as follows: the magnetic members 6→the lid 5→the magnetically conductive tube 15'→the shaft 4→the magnetic members 6. Rotation of the ball bearing 13 is not adversely affected by the magnetism that increases the friction to movement.

According to the present invention, the shaft 4 floats on an axis by magnetic force provided by the first and second magnetic members 6 to thereby reduce the load to the bearing 3. Thus, the frictional resistance is low, and rotation of the motor is smooth with a low noise. The motor is shock-resistant and has a long life. Thus, the motor is particularly suitable for portable electronic products. The bearing 3 may be any suitable bearing, not limited to a ball bearing.

Although the invention has been explained in relation to its preferred embodiments as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A brushless D.C. motor comprising:
    a casing having a tube, the casing further including a removable lid and a first center magnetic pillar mounted thereon, so that changing of the first center magnetic pillar is allowed when assembled;
    a bearing mounted in the tube;
    a stator mounted around the tube; and
    a rotor rotatably mounted around the stator and having a shaft rotatably received in the tube, the shaft including a first end attached to the rotor and a second end, a second magnetic rod being integrally formed on the second end of the shaft and facing and being spaced from the first center magnetic pillar for attracting each other, the first center magnetic pillar being positioned and axially aligned with the second magnetic rod on a common axis, the first center magnetic pillar and the second magnetic rod cooperating with the bearing to maintain the shaft in a plane on which the shaft is installed.

2. The brushless D.C. motor as claimed in claim 1, wherein the tube of the casing includes a hole in which the shaft of the rotor is received, further comprising a magnetically conductive tube mounted in the hole.

3. The brushless D.C. motor as claimed in claim 1, wherein the tube of the casing includes a bole in which the shaft of the rotor is received, further comprising a protective element mounted around the shaft and adjacent to the second end of the shaft.

4. The brushless D.C. motor as claimed in claim 1, wherein the rotor further includes a plurality of blades on an outer periphery thereof.

5. The brushless D.C. motor as claimed in claim 1, wherein the first magnetic member includes a distal end axially aligned with the distal end of the second magnetic member.

* * * * *